United States Patent
Park et al.

(10) Patent No.: US 9,236,009 B2
(45) Date of Patent: Jan. 12, 2016

(54) ORGANIC LIGHT EMITTING DISPLAY DEVICE INCLUDING EMISSION DRIVER AND DRIVING METHOD THEREOF

(75) Inventors: Jong-Hwa Park, Gangnam-gu (KR); Baek-Woon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 663 days.

(21) Appl. No.: 13/184,392

(22) Filed: Jul. 15, 2011

(65) Prior Publication Data

US 2012/0062613 A1    Mar. 15, 2012

(30) Foreign Application Priority Data

Sep. 14, 2010   (KR) ........................ 10-2010-0090183

(51) Int. Cl.
*G09G 3/32* (2006.01)
*G09G 5/00* (2006.01)
*H04N 7/083* (2006.01)

(52) U.S. Cl.
CPC .............. *G09G 3/3233* (2013.01); *G09G 5/006* (2013.01); *H04N 7/083* (2013.01); *G09G 2320/0271* (2013.01); *G09G 2320/0626* (2013.01)

(58) Field of Classification Search
CPC .... G09G 5/006; G09G 2310/08; H04N 7/083
USPC .................................................... 345/83, 690
See application file for complete search history.

(56) References Cited

U.S. PATENT DOCUMENTS

| | | | |
|---|---|---|---|
| 5,940,070 A * | 8/1999 | Koo | 715/203 |
| 7,268,717 B2 | 9/2007 | Baek | |
| 2005/0168420 A1* | 8/2005 | Chung | 345/87 |
| 2006/0092146 A1 | 5/2006 | Johnson et al. | |
| 2008/0284693 A1 | 11/2008 | Sarma et al. | |
| 2010/0097358 A1* | 4/2010 | Totoki | 345/204 |
| 2010/0128064 A1* | 5/2010 | Taylor et al. | 345/690 |
| 2010/0220086 A1* | 9/2010 | Chung et al. | 345/211 |
| 2011/0050870 A1* | 3/2011 | Hanari | 348/56 |

FOREIGN PATENT DOCUMENTS

| | | | |
|---|---|---|---|
| CN | 1818997 A | 8/2006 | |
| CN | 1912978 A | 2/2007 | |
| JP | 2005345779 A * | 12/2005 | G09G 3/36 |
| KR | 10-2006-0099091 A | 9/2006 | |

OTHER PUBLICATIONS

Machine based English translation of Japanese Publication 2005-345779 A.*

* cited by examiner

*Primary Examiner* — John Kirkpatrick
(74) *Attorney, Agent, or Firm* — Christie, Parker & Hale, LLP

(57) ABSTRACT

An organic light emitting display device includes: a display panel; a timing controller configured to receive image data when a vertical sync signal is activated, to receive reference data corresponding to the image data when the vertical sync signal is deactivated, and to generate an emission control signal in accordance with emission duty information of the reference data; and an emission driver configured to supply first and second emission powers to the display panel, and to control a duration of a period during which a potential difference between the first and second emission powers is greater than or equal to a reference value in accordance with the emission control signal.

13 Claims, 5 Drawing Sheets

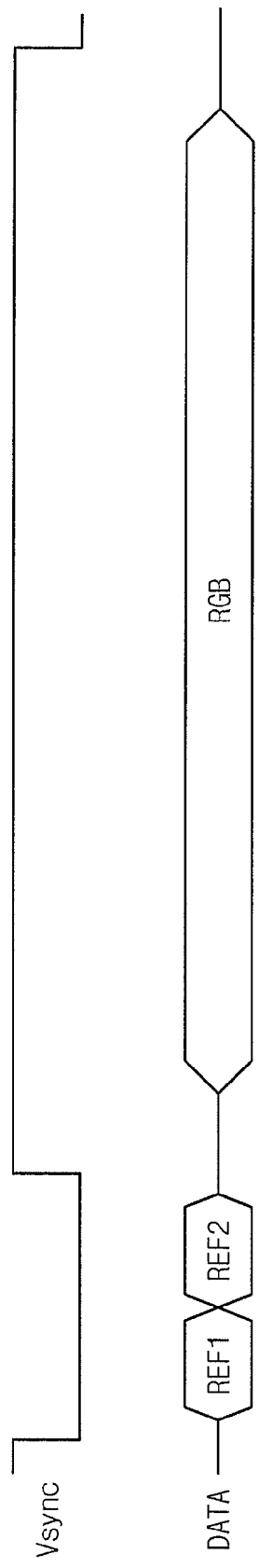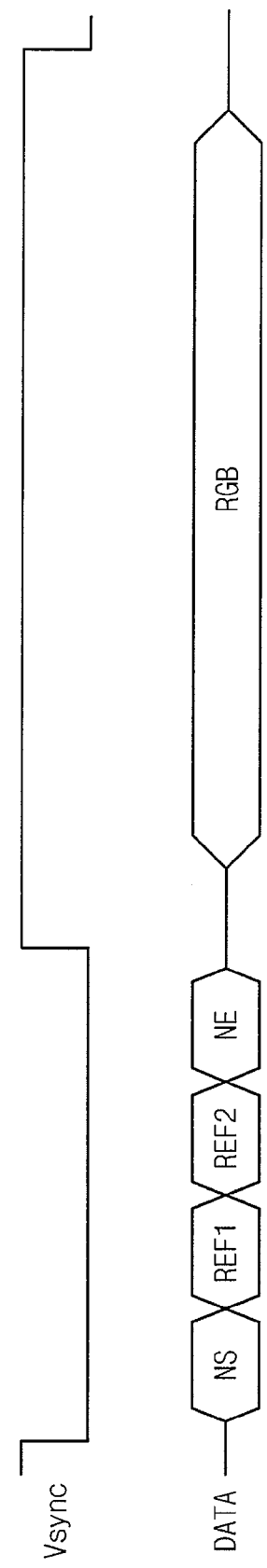

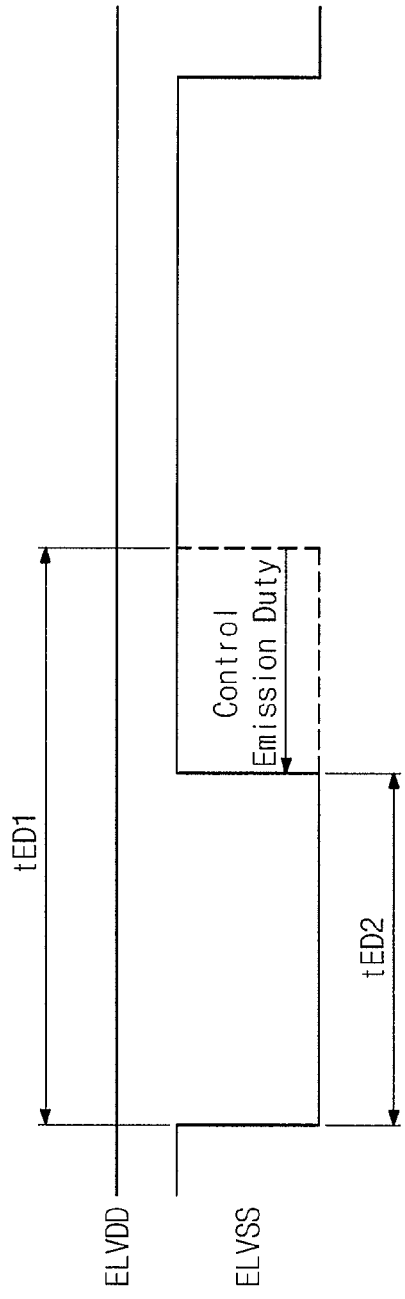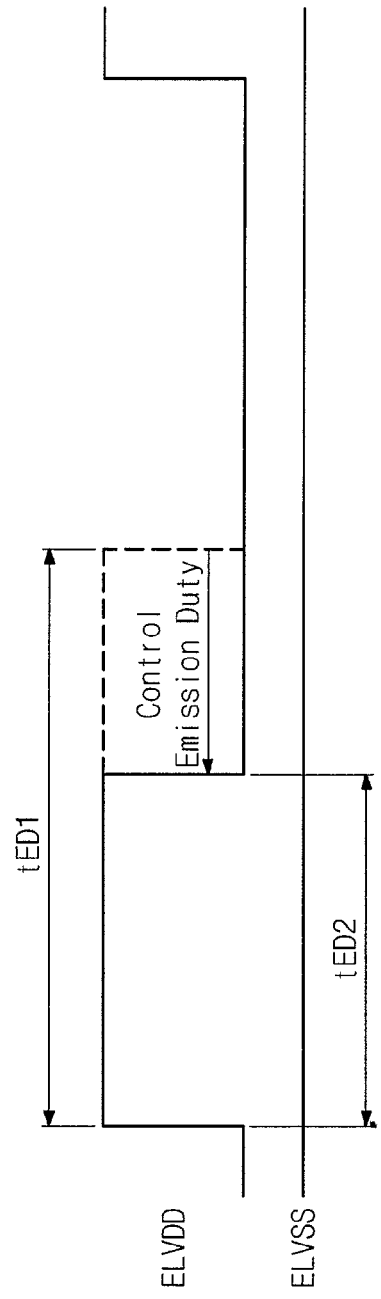

ORGANIC LIGHT EMITTING DISPLAY DEVICE INCLUDING EMISSION DRIVER AND DRIVING METHOD THEREOF

CROSS-REFERENCE TO RELATED APPLICATIONS

This application claims priority to and the benefit of Korean Patent Application No. 10-2010-0090183, filed on Sep. 14, 2010, the entire content of which is incorporated herein by reference.

BACKGROUND

1. Field

Embodiments of the present invention relate to an organic light emitting display device and a driving method thereof.

2. Description of Related Art

Various flat display devices, which have reduced weight and volume compared to the existing cathode ray tubes (CRTs), have been developed. The flat display devices include plasma display panels (PDPs), liquid crystal displays (LCDs), field emission display devices (FEDs) and organic light emitting display devices.

Among the flat display devices, the organic light emitting display devices display images using organic light emitting diodes (OLEDs). Each of the OLEDs includes an organic material layer, being a light emitting material, between an anode for injecting holes and a cathode for injecting electrons. The OLEDs emit light through recombination of the holes and the electrons that are injected into the organic material layer. The brightness of the light emitted is controlled by the amount of a current flowing to the OLED.

Due to a self emission characteristic, the organic light emitting display devices have a fast response time and a low power consumption without using a separate light source such as a backlight.

SUMMARY

Embodiments of the present invention are directed to an organic light emitting display device and a driving method thereof, which controls the brightness and light emitting time of a display panel.

Embodiments of the present invention provide an organic light emitting display device including: a display panel; a timing controller configured to receive image data when a vertical sync signal is activated, to receive reference data corresponding to the image data when the vertical sync signal is deactivated, and to generate an emission control signal in accordance with emission duty information of the reference data; and an emission driver configured to supply first and second emission powers to the display panel, and to control a duration of a period during which a potential difference between the first and second emission powers is greater than or equal to a reference value in accordance with the emission control signal.

The organic light emitting display device may further include a data driver configured to apply a plurality of data output voltages to a plurality of data lines coupled to the display panel, wherein the timing controller may be configured to convert a gray level value of the image data to converted image data in accordance with gray level information of the reference data, and wherein the data output voltages may correspond to the converted image data.

The timing controller may be configured to control a gray level range of the image data in accordance with the gray level information, and may be configured to convert the gray level value of the image data in proportion to a control amount of the gray level range.

The timing controller may be configured to receive, when the vertical sync signal is deactivated, start notification data for indicating a start of the reference data and end notification data for indicating an end of the reference data.

The timing controller may be configured to block, when the vertical sync signal is deactivated, data received before the start notification data is received and after the end notification data is received.

The vertical sync signal may be activated after being deactivated for each frame.

The first emission power may be maintained at a first potential, and the second emission power may swing between the first potential and a second potential, the second potential being lower than the first potential.

In still further embodiments, the second emission power may be maintained at a first potential, and the first emission power may swing between the first potential and a second potential, the second potential being higher than the first potential.

In another embodiment of the present invention, an organic light emitting display device includes: a display panel coupled to a plurality of data lines; a timing controller configured to receive an input data signal including image data of one frame and first and second reference data corresponding to the image data during one period of a vertical sync signal, to convert a gray level value of the image data to generate converted image data in accordance with the first reference data, and to generate an emission control signal in accordance with the second reference data; a data driver configured to apply a plurality of data output voltages corresponding to the converted image data to the data lines; and an emission driver configured to supply first and second emission powers to the display panel, and to control a duration of a period when a potential difference between the first and second emission powers is greater than or equal to a reference value in accordance with the emission control signal.

The timing controller may be configured to receive the image data during an active period of the vertical sync signal, and to receive the first and second reference data during an inactive period of the vertical sync signal.

The timing controller may be configured to receive the first and second reference data prior to the image data.

The timing controller may be configured to convert the gray level value of the image data in accordance with a gray level range of the image data which is controlled in accordance with the gray level information.

The potential difference may occur due to a swing of a potential of the first emission power or a swing of a potential of the second emission power.

The input data signal may include start notification data for indicating a start of the reference data and end notification data for indicating an end of the reference data.

In still another embodiment of the present invention, a method of driving organic light emitting display device includes: receiving an input data signal including image data and reference data corresponding to the image data; generating an emission control signal in accordance with emission duty information of the reference data; controlling a duration of a period when a potential difference between the first and second emission powers is greater than or equal to a reference value in accordance with the emission control signal; and supplying the first and second emission powers to a display panel.

The method may further include: converting a gray level value of the image data to generate converted image data in accordance with gray level information of the reference data; and applying a plurality of data output voltages corresponding to the converted image data to the display panel.

During the receiving of the input data signal, the image data may be received while a vertical sync signal is activated, and the reference data may be received while the vertical sync signal is deactivated.

During the receiving of the input data signal, the input data signal may include start notification data for indicating a start of the reference data, and end notification data for indicating an end of the reference data.

The generating of the converted image data may include: controlling a gray level range of the image data in accordance with the gray level information; and converting the gray level value of the image data in accordance with a control amount of the gray level range.

In the controlling of the duration of the period, the potential difference may occur due to a swing of the first emission power or a swing of the second emission power.

BRIEF DESCRIPTION OF THE DRAWINGS

The accompanying drawings are included to provide a further understanding of embodiments of the present invention, and are incorporated in and constitute a part of this application. The drawings illustrate exemplary embodiments of the present invention and, together with the description, serve to explain principles of the present invention.

FIG. 3 is a timing diagram for describing a method of transmitting input data signal according to one embodiment of the present invention;

FIG. 4 is a timing diagram for describing a method of transmitting input data signal according to another embodiment of the present invention;

FIGS. 6 and 7 are timing diagrams showing a change of a light emitting time based on control of an emission duty according to embodiments of the present invention.

DETAILED DESCRIPTION

Exemplary embodiments of the present invention will be described below in more detail with reference to the accompanying drawings. The present invention may, however, be embodied in different forms and should not be construed as being limited to the embodiments set forth herein. Rather, these embodiments are provided so that this disclosure will be thorough and complete, and will fully convey the scope of the present invention to those skilled in the art.

An organic light emitting display device according to embodiments of the present invention receives reference data for image data of one frame in the inactive period of a vertical sync signal, and receives the image data in the active period of the vertical sync signal. The organic light emitting display device varies a data output voltage and an emission duty (or an emission duty ratio) in accordance with the reference data to control the brightness and light emitting time of a display panel.

That is, the organic light emitting display device according to embodiments of the present invention performs a dimming operation based on reference data received from the outside, in the inactive period of the vertical sync signal.

Hereinafter, exemplary embodiments of the present invention will be described in detail with reference to the accompanying drawings.

Figure 1:
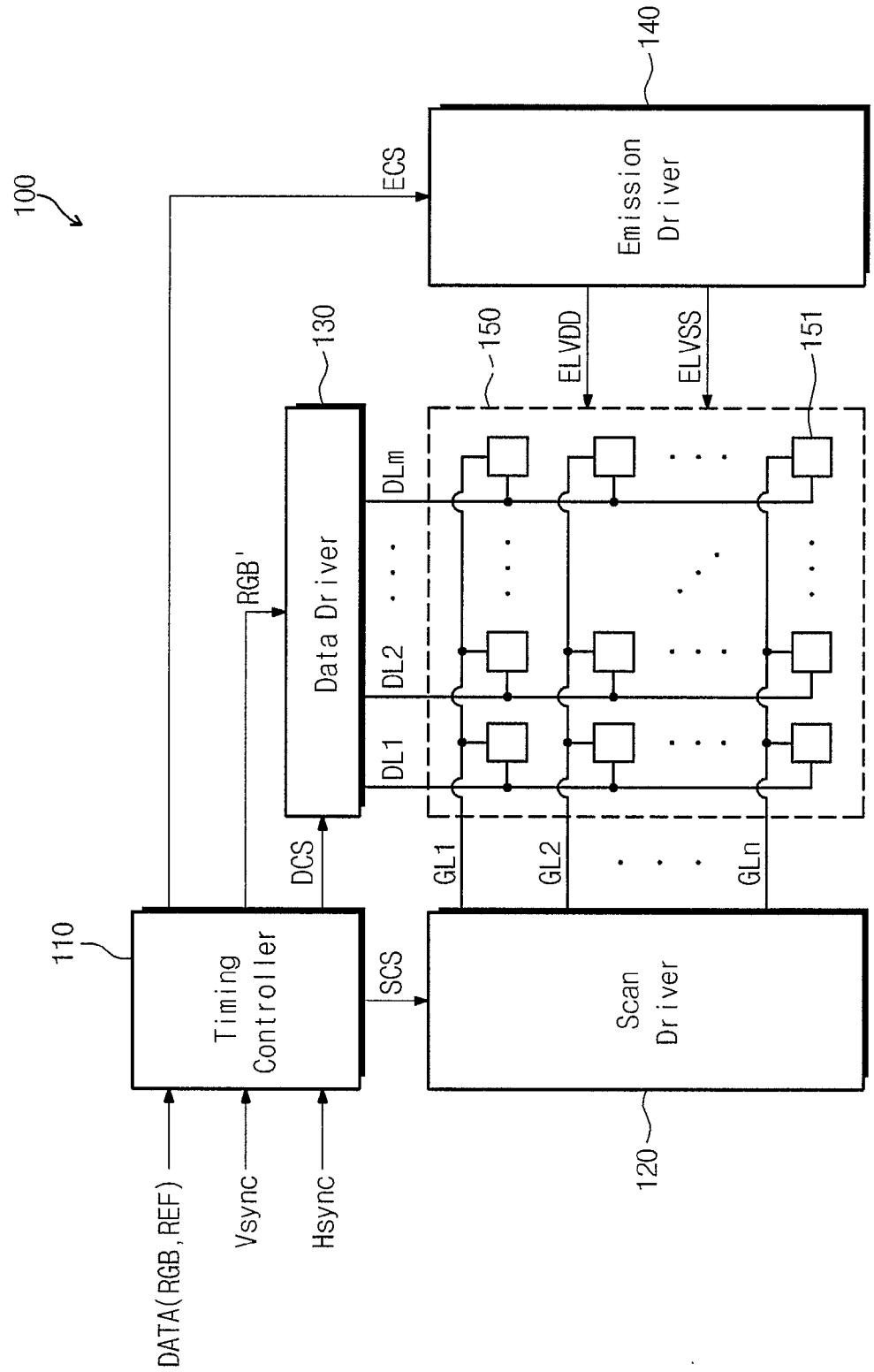
FIG. 1 is a block diagram illustrating an organic light emitting display device according to an embodiment of the present invention.

FIG. 1 is a block diagram illustrating an organic light emitting display device according to an embodiment of the present invention.

Referring to FIG. 1, an organic light emitting display device 100 includes a timing controller 110, a scan driver 120, a data driver 130, an emission driver 140, and a display panel 150.

The timing controller 110 receives a vertical sync signal Vsync, a horizontal sync signal Hsync and an input data signal DATA that are transferred from the outside. Herein, the input data signal DATA of a frame includes image data RGB and reference data REF for the image data. The timing controller 110 receives the reference data REF while the vertical sync signal Vsync is deactivated, and receives the image data RGB corresponding to the reference data REF while the vertical sync signal Vsync is activated. This will be described in more detail with reference to FIGS. 3 and 4.

The reference data REF includes gray level (or gray scale) information for corresponding image data RGB, and the emission duty (e.g., emission duty ratio) information of a corresponding frame.

The timing controller 110 generates a scan control signal SCS and a data control signal DCS in accordance with the vertical sync signal Vsync and the horizontal sync signal Hsync. The timing controller 110 supplies the scan control signal SCS to the scan driver 120 and supplies the data control signal DCS to the data driver 130.

The timing controller 110 converts the gray level (e.g., the gray scale value) of the image data RGB based on a gray level range (e.g., a gray scale range) that is controlled in accordance with the gray level information of the reference data REF. For example, according to one embodiment of the present invention, the gray level value of the image data RGB is converted in proportion to a control amount of the gray level range. The timing controller 110 supplies image data RGB' (hereinafter referred to as converted image data) having a converted gray level value to the data driver 130.

The timing controller 110 generates an emission control signal ECS for controlling the light emitting time of a corresponding frame in accordance with the emission duty information of the reference data REF. The timing controller 110 supplies the emission control signal ECS to the emission driver 140.

The scan driver 120 sequentially supplies a gate voltage to gate lines GL1 to GLn, in accordance with the scan control signal SCS supplied by the timing controller 110.

The data driver 130 supplies data output voltages corresponding to the converted image data RGB' to data lines DL1 to DLm, in accordance with the data control signal DCS supplied from the timing controller 110.

The emission driver 140 supplies first and second emission powers ELVDD and ELVSS to the display panel 150. The emission driver 140 controls a time when a potential difference (e.g., a voltage potential difference) equal to or greater than a reference value occurs between the first and second emission powers ELVDD and ELVSS, in accordance with the emission control signal ECS supplied by the timing controller 110.

The display panel 150 is coupled to the scan driver 120 through the gate lines GL1 to GLn, and is coupled to the data driver 130 through the data lines DL1 to DLm. The display panel 150 includes a plurality of pixels 151 that are arranged in rows and columns (e.g., a matrix of rows and columns). Each of the pixels 151 is coupled to a corresponding gate line and a corresponding data line.

Figure 2:
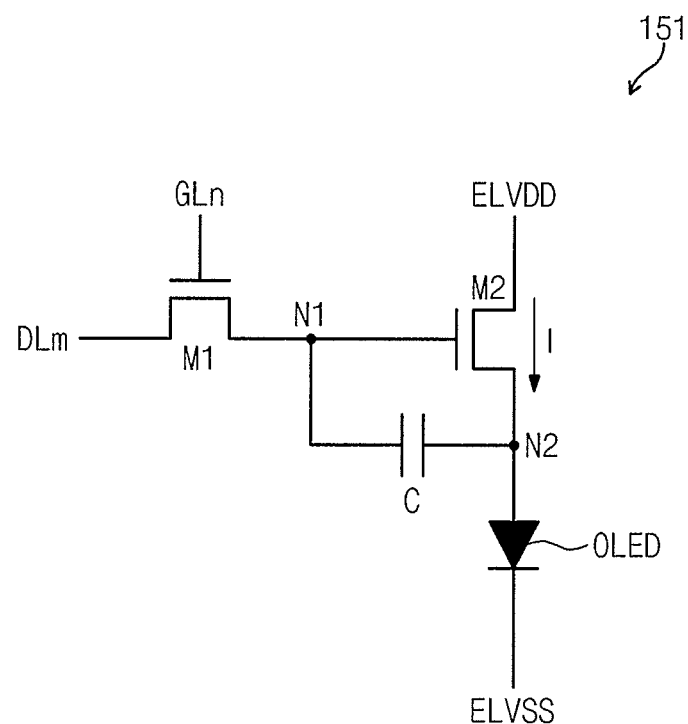
FIG. 2 is a circuit diagram illustrating a pixel of FIG. 1 according to an embodiment of the present invention.

FIG. 2 is a circuit diagram illustrating a pixel of FIG. 1 according to one embodiment of the present invention. For the sake of convenience, a pixel coupled to an nth gate line GLn and an mth data line DLm is illustrated.

Referring to FIG. 2, the pixel 151 includes first and second transistors M1 and M2, a storage capacitor C and an organic light emitting diode OLED.

The first transistor M1 is a transfer transistor and is coupled between the data line DLm and a first node N1. The first transistor M1 is turned on by a gate voltage that is supplied through the gate line GLn, and transfers a data output voltage, which is supplied through the data line DLm, to the first node N1. The data output voltage transferred to the first node N1 is stored in the storage capacitor C that is coupled between the first node N1 and a second node N2.

The second transistor M2 is a driving transistor and is coupled between first and second emission power sources for supplying the first and second emission powers ELVDD and ELVSS, respectively. The second transistor M2 is turned on by the data output voltage transferred to the first node N1 and controls a driving current I flowing to the organic light emitting diode OLED. The magnitude (or strength) of the driving current I is determined in accordance with the data output voltage. The brightness of the light emitted by the organic light emitting diode OLED is proportional to the magnitude of the driving current I. Therefore, the brightness of the organic light emitting diode OLED is also determined in accordance with the data output voltage. As a result, because the data output voltage corresponds to the converted image data RGB', the brightness of the light emitted by the organic light emitting diode OLED may be controlled in accordance with the gray level information of the reference data REF. This will be described below in more detail with reference to FIG. 5.

According to one embodiment of the present invention, the organic light emitting diode OLED includes an organic material layer, being a light emitting material, between an anode for injecting holes and a cathode for injecting electrons. The organic material layer is formed by stacking a Hole Injection Layer (HIL), a Hole Transport Layer (HTL), an Emission Layer (EML), an Electron Transport Layer (ETL) and an Electron Injection Layer (EIL). Holes supplied through the hole injection layer and the hole transport layer recombine with electrons supplied through the electron injection layer and the electron transport layer in the emission layer, thus causing the organic light emitting diode OLED to emit light.

The organic light emitting diode OLED is coupled between the second emission power source for supplying the second emission power ELVSS and the second node N2. For example, the anode of the organic light emitting diode OLED is coupled to the second node N2, and the cathode of the organic light emitting diode OLED is coupled to the second emission power source for supplying the second emission power ELVSS.

The driving current I flows through the organic light emitting diode OLED to emit light. A potential difference greater than or equal to a reference value between the first and second emission power sources ELVDD and ELVSS is supplied for the driving current to flow.

According to a Simultaneous Emission with Active Voltage (SEAV) method, one frame includes an emission period (or section) and a non-emission period (or section). Herein, the emission period is a period during which the organic light emitting diode OLED emits light because a potential difference between the first and second emission powers ELVDD and ELVSS is greater than or equal to the reference value. Furthermore, the non-emission period is a period during which the organic light emitting diode OLED does not emit light because a potential difference between the first and second emission powers ELVDD and ELVSS is not greater than or equal to the reference value.

The duration of the emission period and the non-emission period is controlled in accordance with the emission control signal ECS (see FIG. 1) that is supplied by the timing controller 110 (see FIG. 1). As a result, the duration of the emission period and the non-emission period may be controlled in accordance with the emission duty ratio information of the reference data REF. In other words, an emission duty ratio may be controlled according to the emission duty ratio information of the reference data REF. This will be described below in more detail with reference to FIGS. 6 and 7.

FIG. 3 is a timing diagram illustrating a method of transmitting input data signal according to one embodiment of the present invention. FIG. 4 is a timing diagram for describing a method of transmitting input data signal according to another embodiment of the present invention. For the sake of convenience, an input data signal that is transmitted for one period of the vertical sync signal Vsync is illustrated.

Referring to FIG. 3, the input data signal DATA of one frame that is received during one period of the vertical sync signal Vsync includes first and second reference data REF1 and REF2, and image data RGB corresponding to the first and second reference data. Herein, the first and second reference data REF1 and REF2 are received prior to the corresponding image data RGB while the vertical sync signal Vsync is deactivated. Subsequently, the image data RGB corresponding to the first and second reference data REF1 and REF2 are received while the vertical sync signal Vsync is activated.

Referring to FIG. 4, the input data signal DATA of one frame that is received for one period of the vertical sync signal Vsync may further include a start notification data NS and an end notification data NE.

Herein, the start notification data NS and the end notification data NE are data for respectively notifying (or indicating) the start and end of the first and second reference data REF1 and REF2. The start notification data NS and the end notification data NE are received while the vertical sync signal Vsync is deactivated. According to one embodiment of the present invention, the start notification data NS is received before the first reference data REF1 is received, and the end notification data NE is received after the second reference data REF2 is received.

The timing controller 110 (see FIG. 1) blocks data received before the start notification data NS is received and after the end notification data NE is received, during the inactive period of the vertical sync signal Vsync, and thus unnecessary data is not received while the first and second reference data REF1 and REF2 are received.

The input data signal according to an embodiment illustrated in FIG. 4 is substantially the same as the input data signal in the embodiment illustrated in FIG. 3. Therefore, a repetitive description thereof will be omitted.

Referring to FIGS. 3 and 4, as embodiments of the present invention, the first reference data REF1 includes gray level information, and the second reference data REF2 includes emission duty (e.g., emission duty ratio) information. As the inactive period of the vertical sync signal Vsync enlarges (e.g., increases in length), the first and second reference data REF1 and REF2 may include more detailed gray level information and emission duty information. This denotes that the brightness and light emitting time of the display panel can be controlled more accurately.

As described above, an organic light emitting display device 100 according to an embodiment of the present invention receives information for controlling the brightness and the light emitting time of the display panel from reference data included in an input data signal. Therefore, the number of control signal lines located between the outside and the organic light emitting display device 100 for dimming the display panel can be reduced.

Figure 5:
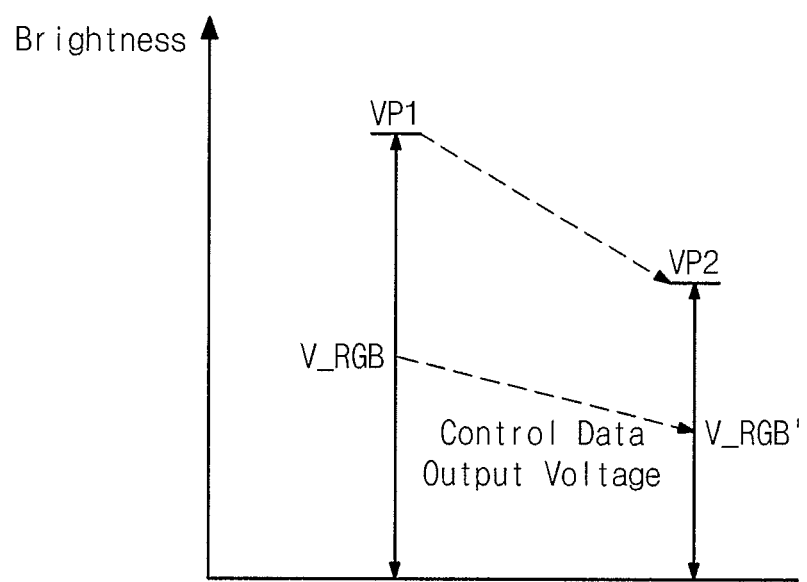
FIG. 5 is an exemplary diagram showing brightness change based on control of a data output voltage according to one embodiment of the present invention.

FIG. 5 is an exemplary diagram showing brightness change based on control of a data output voltage according to one embodiment of the present invention.

Referring to FIGS. 1 and 5, for the sake of convenience, it is assumed that the range of a data output voltage (hereinafter referred to as a first output range) before brightness control is less than or equal to a first peak voltage VP1, and the range of a data output voltage (hereinafter referred to as a second output range) after brightness control is less than or equal to a second peak voltage VP2, the second peak voltage VP2 being lower than the first peak voltage VP1.

The gray level range (hereinafter referred to as a first gray level range) of image data RGB corresponds to the first output range, and the gray level range (hereinafter referred to as a second gray level range) of converted image data RGB' corresponds to the second output range. Therefore, when the gray level range of the image data RGB is controlled (e.g., converted) from the first gray level range to the second gray level range according to gray level information of reference data REF, the range of the data output voltage is also controlled (e.g., converted) from the first output range to the second output range.

The gray level value of the image data RGB is changed in accordance with (e.g., proportion to) the control amount of a gray level range. Furthermore, a data output voltage V_RGB corresponding to the image data RGB is also changed in accordance with (e.g., proportion to) the control amount of a gray level range. For example, a relationship such as "V_RGB:V_RGB'=first output range:second output range=first gray level range:second gray level range" is established between the data output voltage V_RGB corresponding to the image data RGB and the data output voltage V_RGB' corresponding to the converted image data RGB'.

As a result, the organic light emitting display device 100 according to an embodiment of the present invention controls the data output voltage in accordance with the gray level information of the reference data REF, thereby controlling brightness of the display panel 150. In this way, by controlling brightness, the organic light emitting display device 100 decreases power consumption and reduces the IR drop of the driving transistor of each pixel, thereby increasing stability.

FIGS. 6 and 7 are timing diagrams showing a change of a light emitting time based on control of an emission duty according to embodiments of the present invention. For the sake of convenience, the voltage levels of first and second emission powers ELVDD and ELVSS during one frame are shown.

Referring to FIG. 6, the first emission power ELVDD is constant and the second emission power ELVSS swings, wherein one frame is divided into an emission period and a non-emission period.

Referring to FIG. 7, the second emission power ELVSS is constant and the first emission power ELVDD swings, wherein one frame is divided into an emission period and a non-emission period.

As described above with reference to FIG. 1, the emission duty (or emission duty ratio) is controlled by the emission control signal ECS that is generated in accordance with the emission duty information of the reference data REF. According to one embodiment of the present invention, control of the emission duty refers to control of the light emitting time.

Referring to FIGS. 1 and 6, according to one embodiment of the present invention, by controlling the duty (or voltage) of the second emission power ELVSS in accordance with the emission control signal ECS, the light emitting time (e.g., duration of the light emission) of the display panel 150 may be controlled to be in a range between a first light emitting time tED1 and a second light emitting time tED2.

Referring to FIGS. 1 and 7, according to one embodiment of the present invention, by controlling the duty (or voltage) of the first emission power ELVDD in accordance with the emission control signal ECS, the light emitting time (e.g., duration of the light emission) of the display panel 150 may be controlled to be in a range between a second light emitting time tED2 and a first light emitting time tED1.

The organic light emitting display device 100 according to an embodiment of the present invention controls the emission duty in accordance with the emission duty information of the reference data REF, thereby controlling the light emitting time of the display panel 150. In this way, the organic light emitting display device 100 shortens a Motion Picture Response Time (MPRT) by controlling the light emitting time, thereby reducing motion blur when displaying a moving image.

An organic light emitting display device and a driving method thereof according to embodiments of the present invention can reduce the number of the control signal lines for dimming of the display panel. Moreover, by controlling brightness, the organic light emitting display device and the driving method decrease power consumption and reduce the IR drop of the driving transistor of each of the pixels, thereby increasing stability. Furthermore, the organic light emitting display device and the driving method shorten the MPRT by controlling a light emitting time, thereby reducing motion blur when displaying a moving image.

The above-disclosed subject matter is to be considered illustrative and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An organic light emitting display device comprising:
    a display panel;
    a timing controller configured to receive a vertical sync signal, a horizontal sync signal, and input data signal, the input data signal comprising image data and reference data generated prior to the image data in a frame, and the timing controller configured to receive the image data when the vertical sync signal is activated, to receive the reference data corresponding to the image data when the vertical sync signal is deactivated, and to generate an emission control signal in accordance with emission duty information of the reference data, the emission control signal being configured to control an emission time of the frame;
    an emission driver configured to supply first and second emission powers to the entire display panel, and to control a duration of a period during which a potential difference between the first and second emission powers is greater than or equal to a reference value in accordance with the emission control signal; and a data driver configured to apply a plurality of data output voltages to a plurality of data lines coupled to the display panel, wherein the reference data includes gray level information for corresponding image data and the emission duty information, wherein the emission duty information is determined independently of the gray level information, wherein the timing controller is configured to convert a gray level value of the image data to converted image data in accordance with the gray level information of the reference data, wherein the data output voltages correspond to the converted image data, and wherein the timing controller is configured to control a gray level range of the image data in accordance with the gray level information, and is configured to convert the gray level value of the image data in proportion to a control amount of the gray level range.

2. The organic light emitting display device of claim 1, wherein the timing controller is configured to receive, when the vertical sync signal is deactivated, start notification data for indicating a start of the reference data and end notification data for indicating an end of the reference data.

3. The organic light emitting display device of claim 2, wherein the timing controller is configured to block, when the vertical sync signal is deactivated, data received before the start notification data is received and after the end notification data is received.

4. The organic light emitting display device of claim 1, wherein the vertical sync signal is activated after being deactivated for each frame.

5. The organic light emitting display device of claim 1, wherein the first emission power is maintained at a first potential, and the second emission power swings between the first potential and a second potential, the second potential being lower than the first potential.

6. An organic light emitting display device comprising:
a display panel coupled to a plurality of data lines;
a timing controller configured to receive an input data signal comprising image data of one frame and first and second reference data corresponding to the image data during one period of a vertical sync signal, to convert a gray level value of the image data to generate converted image data in accordance with the first reference data, and to generate an emission control signal in accordance with the second reference data, the emission control signal being configured to control an emission time of the one frame;
a data driver configured to apply a plurality of data output voltages corresponding to the converted image data to the data lines; and
an emission driver configured to supply first and second emission powers to the display panel, and to control a duration of a period when a potential difference between the first and second emission powers is greater than or equal to a reference value in accordance with the emission control signal,
wherein the duration of the period is the emission time of the one frame,
wherein the timing controller receives the first and second reference data prior to the image data in one frame,
wherein the first reference data includes gray level information for corresponding image data, and the second reference data includes emission duty information,
wherein the emission duty information is determined independently of the gray level information, and
wherein the timing controller is configured to convert the gray level value of the image data in accordance with a gray level range of the image data which is controlled in accordance with the first reference data.

7. The organic light emitting display device of claim 6, wherein the timing controller is configured
to receive the image data during an active period of the vertical sync signal, and
to receive the first and second reference data during an inactive period of the vertical sync signal.

8. The organic light emitting display device of claim 6, wherein the potential difference occurs due to a swing of a potential of the first emission power or a swing of a potential of the second emission power.

9. The organic light emitting display device of claim 6, wherein the input data signal comprises start notification data for indicating a start of the reference data, and end notification data for indicating an end of the reference data.

10. A method of driving organic light emitting display device, the method comprising:
receiving an input data signal comprising image data of a frame and reference data corresponding to the image data, and wherein the reference data is received prior to the image data;
generating an emission control signal in accordance with emission duty information of the reference data, the emission control signal being configured to control an emission time of the frame;
controlling a duration of a period when a potential difference between first and second emission powers is greater than or equal to a reference value in accordance with the emission control signal;
supplying the first and second emission powers to a display panel;
wherein the reference data including gray level information for corresponding image data and the emission duty information,
wherein the emission duty information is determined independently of the gray level information,
converting a gray level value of the image data to generate converted image data in accordance with the gray level information of the reference data; and
applying a plurality of data output voltages corresponding to the converted image data to the display panel,
wherein the generating of the converted image data comprises:
controlling a gray level range of the image data in accordance with the gray level information; and
converting the gray level value of the image data in accordance with a control amount of the gray level range.

11. The method of claim 10, wherein during the receiving of the input data signal, the image data is received while a vertical sync signal is activated, and the reference data is received while the vertical sync signal is deactivated.

12. The method of claim 11, wherein during the receiving of the input data signal,
the input data signal comprises start notification data for indicating a start of the reference data, and end notification data for indicating an end of the reference data.

13. The method of claim 10, wherein in the controlling the duration of the period, the potential difference occurs due to a swing of the first emission power or a swing of the second emission power.

* * * * *